Oct. 30, 1962  AKIHIKO SATO  3,061,422
METHOD OF MACHINING SEMICONDUCTORS
Filed Nov. 25, 1960

INVENTOR
AKIHITO SATO
BY Roy C. Hopgood
ATTORNEY

United States Patent Office 3,061,422
Patented Oct. 30, 1962

3,061,422
METHOD OF MACHINING SEMICONDUCTORS
Akihiko Sato, Tokyo, Japan, assignor to Nippon Electric Company Limited, Tokyo, Japan, a corporation of Japan
Filed Nov. 25, 1960, Ser. No. 71,797
3 Claims. (Cl. 51—310)

This invention relates to a method of machining semiconductor materials and, more particularly, to a method in which the semiconductor workpiece is supersonically vibrated.

Semiconductor materials are conventionally shaped by the mechanical machining and diamond cutting methods. Both methods have proved to be satisfactory in the past; the mechanical machining method being more profitable since the loss due to cutting is substantially less.

Recently, however, there has been a demand for shape cutting precision which is ten times greater in order of magnitude than previously obtained. This demand has been occasioned by the requirements for new types of transistors and semiconductor diodes, such as those having a shape generally referred to as Mesa cut. These shapes cannot be obtained by utilizing the conventional methods mentioned above.

Supersonic machining of the materials has also been attempted. A mold of reverse concavity or convexity to the desired semiconductor shape has been made and attached to the end of a supersonic horn; the horn being moved vertically in an abrasive material. Although theoretically possible, as a practical method, it has been impossible to obtain the required cutting precision, because of the extreme control which must be exercised over the transverse vibration of the horn.

Accordingly, it is an object of the invention to provide a method of machining semiconductor materials having the precise shapes required for new type transistors and semiconductor diodes.

It is another object of the invention to provide a semiconductor material machining method which includes the supersonic vibrating of the material, but which does not entail precise control of transverse vibration.

Briefly stated, the invention contemplates the supersonic machining of a plane shaped semiconductor material by utilizing a mold having a shape identical to the shape of the required finished piece. The plane shaped semiconductive material is firmly adhered to the mold and both are inserted into a container having an abrasive fluid therein. The parts, i.e. semiconductive material and the required mold, are supersonically vibrated according to a vibration and time schedule to obtain the finished part having precisioned cuts.

The above mentioned and other features and objects of this invention and the manner of attaining them will become more apparent and the invention itself will be best understood by reference to the following description of an embodiment of the invention taken in conjunction with the accompanying drawing, wherein.

Figure 1:
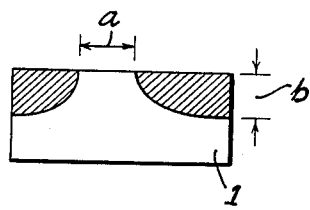
FIG. 1 is a front view of a semiconductor material having the required shape.

Referring now to FIG. 1, a piece of semiconductor material 1, having the shape as shown, is necessary in order to manufacture the newer types of semiconductor devices. The oblique-lined parts of the material must be cut off, leaving the piece, as shown, in which the portion designated $b$ is about fifty microns in depth, and the portion designated $a$ is between 20 to 50 microns in diameter.

Figure 2A:
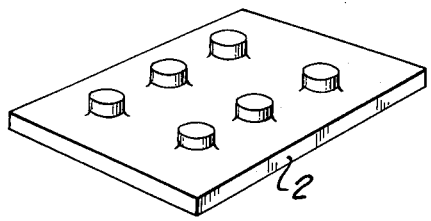
FIGS. 2a and 2b show perspective and front views, respectively, of a mold used in the method of the invention.
Figure 2B:
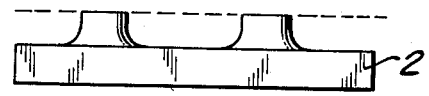
Figure 3A:
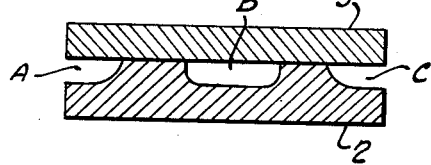
FIG. 3a is a sectional view of the mold and a piece of semiconductor material.
Figure 3B:
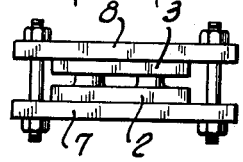
FIG. 3b shows the arrangement of FIG. 3a retained within clamping jaws.

To accomplish this, a mold, preferably of a metallic nature, is constructed to have a shape identical to the desired shape such as for example a group of finished semiconductive pieces. This mold is shown in FIGS. 2a and 2b. A wafer of semiconductor material 3, such as silicon or germanium, is adhered to the mold 2 by a strong adhesive agent, as shown in FIG. 3a. Thereafter, the mold 2 and wafer 3 are pressed together (FIG. 3b) by suitable means, such as the screw clamps 7 and 8.

Figure 4:
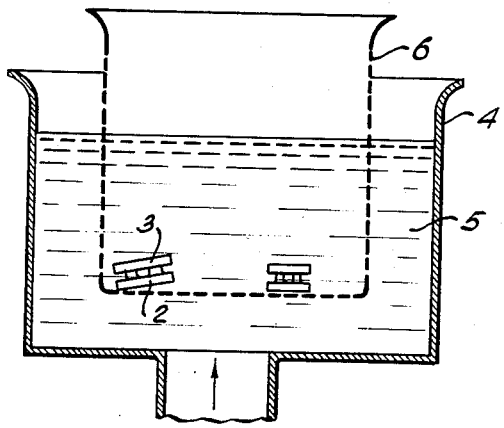
FIG. 4 shows the arrangement of FIG. 3a immersed in an abrasive fluid.
Figure 5:
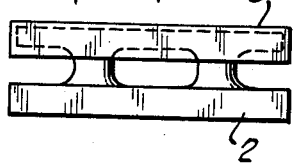
FIG. 5 shows a piece of semiconductor material before and after machining.

Referring to FIG. 4, the adhered mold and wafer without the clamps 7 and 8 are inserted (for example, by the mesh indicated in dotted lines at 6) into a container 4 having a liquid or powdered abrasive 5 therein. Supersonic vibration is then propagated through the container from a vibrator (not shown) the vibrating direction of the supersonic vibration being symmetrical to the adhered mold. The abrasive liquid acts in the concave areas A, B and C of FIG. 3a to scrape and abrade the surface of the wafer 2 which is more abradable than the metal mold producing the desired cuts, as shown by the dotted lines of FIG. 5 because the clamping mechanisms are taken off.

The depth of the required precisioned cuts can be controlled by regulating the degree of vibration and the time of vibrating. Moreover, by controlling the direction of vibration of the abrasive elements, so that the vibration is in one direction with respect to the location of the semiconductor wafer, the shape of the finished piece can be more effectively controlled.

While the foregoing description sets forth the principles of the invention in connection with specific apparatus, it is to be understood that this description is made only by way of example and not as a limitation of the invention as set forth in the objects thereof and in the accompanying claims.

What is claimed is:

1. A method for shaping precisioned cuts in a semiconductive material, comprising adhering said material to a preformed mold having a shape with precisioned cuts, and subjecting said adhered mold and material to supersonic vibratory motion in an abrasive substance, whereby said abrasive substance acts on said semiconductive material only to shape it with precisioned cuts identical to the cuts of said preformed mold.

2. The method of claim 1 wherein
    said semiconductive material is adhered to said mold
        by fixing an adhesive agent between said mold and
        material to position the cuts of said mold as facing
        said material and pressing said mold to said material,
    and the direction of said vibratory motion is fixed in
        one direction with respect to said adhered mold and
        material.

3. A method for shaping precisioned cuts in a semiconductive material comprising
    adhering said material to a preformed mold having a
        molding surface,
    said molding surface having parts thereof of a generally flat nature,
    and having a cavity part comprising predetermined
        shaped cuts between said flat parts,
    said semiconductive material adhering to said mold
        along said flat parts, whereby a space between said mold and said semiconductive material is defined in the region of said cuts, and subjecting said adhered mold and semiconductive material to supersonic vibratory motion in an abrasive substance, whereby said abrasive substance substantially fills the cavity between said semiconductive material and said cuts and acts on said semiconductive material only to shape it with precisioned cuts substantially identical to the cuts of said preformed mold.

References Cited in the file of this patent
UNITED STATES PATENTS

| | | |
|---|---|---|
| 2,591,083 | Maier | Apr. 1, 1952 |
| 2,787,854 | Simjian | Apr. 9, 1957 |
| 2,799,789 | Wolfskill | July 16, 1957 |